Patented Sept. 24, 1946

2,408,174

UNITED STATES PATENT OFFICE 2,408,174

VINYL RESIN COATING COMPOSITIONS

Glen H. Morey, Terre Haute, Ind., assignor to Commercial Solvents Corporation, Terre Haute, Ind., a corporation of Maryland No Drawing. Application March 20, 1944, Serial No. 527,351

6 Claims. (Cl. 260—32)

My invention relates to coating compositions, and more particularly to coating compositions containing polymerized vinyl compounds.

Numerous types and grades of synthetic resins have been produced by the polymerization of vinyl compounds. Among these resins, certain types are particularly adapted for use in coating compositions, for example, resins resulting from the copolymerization of a vinyl halide with a vinyl ester of a lower aliphatic acid. These resins, in general, possess very interesting and useful properties, particularly those resulting from the polymerization of mixtures of vinyl chloride and vinyl acetate with a high proportion of the chloride. Such resins, have great physical and chemical stability and are not readily affected by concentrated hydrochloric, or hydrofluoric acids, 50 per cent sodium hydroxide solution, alcohols, or even by a mixture of potassium dichromate and sulfuric acid. Because of this superior stability, synthetic resins of this type have been suggested for numerous uses in the finishing and coating fields.

Although coating compositions, which employ such resins as the principal film forming material, are capable of solving numerous and long-existing problems in the finishing field, there exist certain common defects which make the use of such resins for coating purposes in particular lines somewhat difficult. For example, contact at elevated temperatures with certain metals, such as zinc, iron, or tin, causes rapid decomposition of polymerized vinyl compounds prepared from vinyl chloride with the liberation of hydrochloric acid. The presence of pigments containing iron or zinc has the same effect. Another of the important handicaps preventing extensive use of vinyl resins in coating compositions, has been the lack of satisfactory solvents therefor, and while there have been found certain materials which are comparatively good solvents for the vinyl resins, both the solutions as well as the resulting film formed, when utilizing such solvents possess defects which restrict greatly the free and general application of such coating compositions. For example, lacquers prepared from vinyl resins of the type described and materials previously found to be satisfactory solvents for said resins possess very poor color stability. Also the films resulting from the application of such compositions, are objectionable because of the disagreeable residual odor which they possess. Thus the use of vinyl resin coating compositions in which such solvents were employed, has been limited considerably.

I have now discovered, that the alkyl esters of levulinic acid serve as particularly good solvents for certain grades of vinyl resins, and that solutions of these resins in the aforesaid solvents possess none of the disadvantages mentioned above which were attributable to the use of prior solvents. In this connection it should be pointed out that the vinyl resins suitable for use in the coating compositions of my invention are those having a molecular weight above 4000 and which are insoluble in toluene. These resins are produced by the copolymerization of a vinyl halide, such as vinyl chloride, with a vinyl ester, for example, vinyl acetate, and I have found that such copolymers containing about 85% vinyl chloride and 15% vinyl acetate are particularly suitable for preparing the coating compositions of my invention. The lower molecular weight, toluene soluble grades of the aforesaid type of resins are substantially insoluble in alkyl esters of levulinic acid, yielding gels when incorporated in said esters.

It is an object of my invention to provide vinyl resin coating compositions which employ alkyl esters of levulinic acid, either alone or in conjunction with suitable diluents.

The alkyl esters of levulinic acid, that I use as solvents for the vinyl resins in my improved coating compositions, may be conveniently prepared by reacting approximately equimolecular quantities of levulinic acid with the desired alcohol in the presence of a catalytic amount of a mineral acid, such as sulfuric acid. Purification of the resulting esters may be effected by means of fractional distillation in the customary manner. Any of the alkyl esters of levulinic acid of suitable boiling points and rates of evaporation, may be used as solvents for the preferred form of vinyl resins disclosed above. Examples of such compounds are the methyl, ethyl, propyl, butyl, isobutyl, isoamyl, and capryl esters of levulinic acid. Certain of these compounds, such as the capryl ester of levulinic acid, possess a sufficiently high boiling point, as well as other desirable properties, to render them useful as plasticizers for vinyl resins of the above-described type, particularly, where the latter are employed as bonding agents in the manufacture of laminated glass.

In order to cheapen the compositions, and frequently for other reasons, it is desirable not to use materials consisting only of a single solvent or solvent mixture. Owing to the high tolerances of the levulinic acid esters for the coal-tar hydrocarbons, such as, for example, benzene, and toluene, large volumes thereof may be used as diluents for the levulinic ester solutions of vinyl resins. Various hydrocarbon mixtures may, of course, also be used as diluents and other materials ordinarily used in synthetic resin coating compositions, may likewise be employed in my improved vinyl resin compositions. For example, plasticizers such as cresyl phosphate, butyl phthalate, butyl phosphate or as mentioned above, the higher alcohol esters of levulinic acid, may be incorporated in such compositions. Other resins, either natural or synthetic, may likewise be used therein. Also pigments or dyes may be added, provided care is taken to avoid the presence of zinc and iron compounds.

The viscosities of vinyl resin coating compositions, as in the case of most other coating compositions, are of considerable importance regardless of the method of application utilized. Inasmuch as the character of the solvent mixture employed affects not only the character of the deposited film obtainable, but also the viscosities of the liquid coating compositions, the choice of proper solvents to use with vinyl resins is highly important, and depends to a large extent on the viscosity characteristics of the solutions obtained therewith. The majority of the solvents previously suggested for use with vinyl resins are unsuitable for the preparation of satisfactory coating compositions, because solutions of the resin made with such solvents not only possess high initial viscosities, but in addition, tend to increase in viscosity on aging and ultimately set to a solid gel. While the alkyl esters of levulinic acid form solutions with the vinyl resins, which likewise possess such characteristics to a certain extent, they exhibit these undesirable properties to a lesser degree than solutions employing the common types of solvent compositions previously used. This coupled with the fact that the odor of the coating compositions of my invention is very mild and agreeable, as compared to that of such compositions formerly available, make them much better suited for most types of vinyl coating compositions than those containing the previously available solvents. Another advantage of the solvents of my invention, over those previously employed, is the fact that the former have higher boiling points and correspondingly lower rates of evaporation than the latter.

Although it is frequently desired to use a diluent in vinyl resin coating compositions, it should be noted that the incorporation of such material ordinarily results in an increase in the viscosity of the composition, and under certain conditions the viscosity increase with leaner mixtures becomes very great. This increase in viscosity, in general, depends upon such factors as temperature of the solution, the concentration of the resin in solution, the viscosity characteristics of the particular resin employed, etc. Therefore, it will be evident that the proportion of diluent to levulinic ester utilized, in any specific coating composition, will vary with the particular diluent, the character and concentration of the resin, the probable length of time before use of the composition, and other such factors. By proper selection of the particular alkyl ester of levulinic acid and the diluent and proportion thereof, both the viscosity and the rate of evaporation of the coating composition can be widely varied so as to obtain lacquers possessing the desired properties. For example, the viscosity of a solution containing 15 grams of vinyl resin per 100 cc. of solvent mixture which consisted of 40 per cent ethyl levulinate, and 60 per cent toluene at 30° C., was found to be 95 centipoises, as compared to 180 centipoises for a solution employing a mixture of 20 per cent ethyl levulinate, and 80 per cent toluene. Where the viscosity is found to be too high for a particular given solvent mixture, it can be very materially lowered by only a slight decrease in the concentration of the vinyl resin incorporated therein.

The following examples are illustrative of the use of alkyl esters of levulinic acid in unpigmented vinyl resin coating compositions.

Example I

Vinyl resin copolymer consisting of approximately 85% vinyl chloride and 15% vinyl acetate_____grams per 100 cc__ 16
Butyl phthalate _____do_____ 2
Ethyl levulinate_____per cent__ 20
Ethyl isobutyl ketone_____do_____ 20
Toluene _____do_____ 60

Example II

Vinyl resin copolymer consisting of approximately 85% vinyl chloride and 15% vinyl acetate_____grams per 100 cc__ 16
Butyle levulinate_____per cent__ 20
1-nitropropane _____do_____ 10
Toluene _____do_____ 70

If desired, other solvents such as ethyl acetate, butyl acetate, nitroethane, 2-nitropropane, etc., or other diluents or diluent mixtures, such as xylene, petroleum naphtha, and hydrogenated petroleum diluents, and other resins, such as damar and mastic, may be incorporated in any of the above formulas. In adding such materials, however, care should ordinarily be exercised not to incorporate substantial amounts of materials tending to increase the viscosity or accelerate the rate of gelling in the solution, such as, for example, the alcohols, which when present in only very small proportions will increase the gelling tendency of the solution.

This is a continuation-in-part of my copending application U. S. Serial No. 465,801, filed November 16, 1942.

What I claim is:

1. A coating composition possessing decreased gelling tendencies, comprising a tough and strong artificial resin insoluble in toluene, having a molecular weight in excess of 4000, and prepared by the copolymerization of vinyl chloride with vinyl acetate, said resin being dissolved in a sufficient quantity of a solvent having a low rate of evaporation to decrease the gelling tendency of the composition, comprising an alkyl ester of levulinic acid and a liquid coal-tar hydrocarbon, to make a readily flowable composition adapted to produce resistant, adhesive, and stable protective or ornamental surface coatings.

2. A coating composition possessing decreased gelling tendencies, comprising a tough and strong artificial resin insoluble in toluene, having a molecular weight in excess of 4000, and prepared by the copolymerization of vinyl chloride with vinyl acetate, said resin being dissolved in a sufficient quantity of a volatile solvent having a low rate of evaporation to decrease the gelling tendency of the resulting composition comprising ethyl levulinate, to make a readily flowable composition adapted to produce resistant, adhesive, and stable protective or ornamental surface coatings.

3. A coating composition possessing decreased gelling tendencies, comprising a tough and strong artificial resin insoluble in toluene, having a molecular weight in excess of 4000, and prepared by the copolymerization of vinyl chloride with vinyl acetate, said resin being dissolved in a sufficient quantity of a volatile solvent having a low rate of evaporation to decrease the gelling tendency of the composition, comprising ethyl levulinate and a liquid coal-tar hydrocarbon, to make a readily flowable composition adapted to produce resistant, adhesive, and stable protective or ornamental surface coatings.

4. A coating composition possessing decreased gelling tendencies, comprising a tough and strong artificial resin insoluble in toluene, having a molecular weight in excess of 4000, and prepared by the copolymerization of vinyl chloride with vinyl acetate, said resin being dissolved in a sufficient quantity of a volatile solvent having a low rate of evaporation to decrease the gelling tendency of the resulting composition comprising butyl levulinate, to make a readily flowable composition adapted to produce resistant, adhesive, and stable protective or ornamental surface coatings.

5. A coating composition possessing decreased gelling tendencies, comprising a tough and strong artificial resin insoluble in toluene, having a molecular weight in excess of 4000, and prepared by the copolymerization of vinyl chloride with vinyl acetate, said resin being dissolved in a sufficient quantity of a volatile solvent having a low rate of evaporation to decrease the gelling tendency of the composition, comprising butyl levulinate and a liquid coal-tar hydrocarbon, to make a readily flowable composition adapted to produce resistant, adhesive, and stable protective or ornamental surface coatings.

6. A coating composition possessing decreased gelling tendencies, comprising a tough and strong vinyl resin copolymer having a molecular weight in excess of 4000 insoluble in toluene, and consisting of approximately 85% vinyl chloride and 15% vinyl acetate, said resin being dissolved in a sufficient quantity of a solvent having a low rate of evaporation to decrease the gelling tendency of the resulting composition comprising a lower alkyl ester of levulinic acid, to make a readily flowable composition adapted to produce resistant, adhesive, and stable protective or ornamental surface coatings.

GLEN H. MOREY.